Patented Jan. 3, 1933

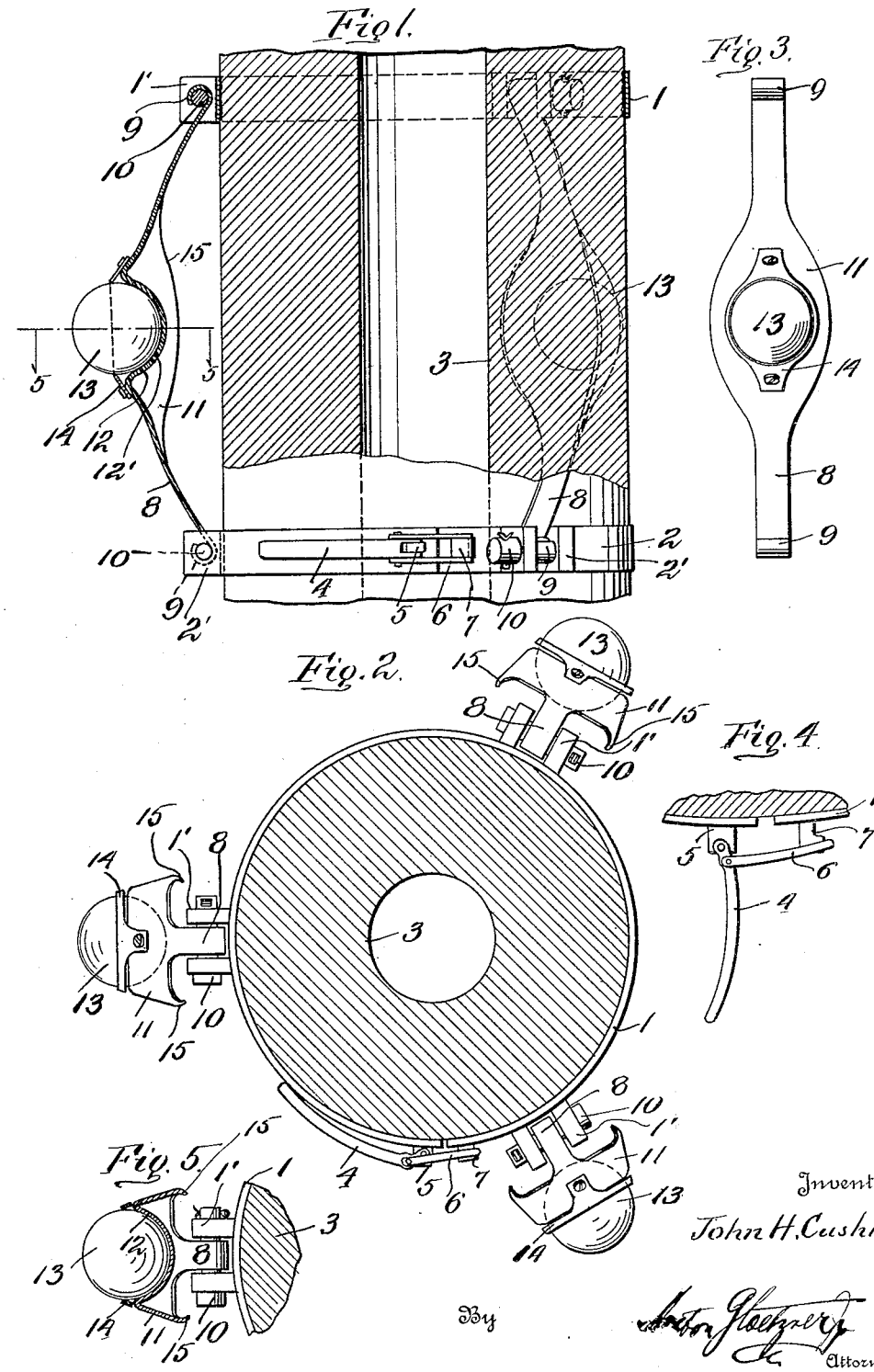

1,893,020

UNITED STATES PATENT OFFICE

JOHN H. CUSHING, OF LOS ANGELES, CALIFORNIA

DRILL PIPE PROTECTOR

Application filed May 23, 1929. Serial No. 365,294.

My invention relates to means for use in connection with pipes, rods and other instruments employed in drilling wells and it has especial reference to a device for attachment to drill rods or pipes of rotary drilling rigs to maintain same in a true unvarying line and prevent same from contacting with the wall of the well casing or of an open hole.

The primary object of this invention is to provide a simple appliance which may be readily positioned and locked upon drill pipe, prevent the pipe from "whipping" during the drilling operation.

Other and important objects of the invention are to provide a device of this character which will maintain the drill pipe in perpendicular position at all times; which will prevent the drill pipe from striking against the casing or the wall of an open hole; and which will keep the drill pipe centered thus insuring a straight hole.

These and other objects are attained by the invention set out in detail in the following specification and expressed in one of its desirable forms in the accompanying drawing, which forms a part thereof.

In the drawing,

Fig. 1 is an elevational view, partly in section, showing my invention as applied to drill pipe.

Fig. 2 is a plan view.

Fig. 3 is a detail of one of the resilient members.

Fig. 4 is a fragmentary detail of a form of device that may be used to secure the protector to the drill pipe, and, Fig. 5 is a sectional view on the line 5—5 of Fig. 1.

The invention consists of a means attachable to and rotatable with a rotary drill rod or pipe, and provided with resilient members in which are disposed anti-friction means arranged for engagement with the casing in a hole or with the wall of the hole to maintain the drill rod or pipe in a straight line, prevent vibration of the drill rod, to remove strain from the joints and couplings of the drill pipe and to prevent crystallization of the drill pipe due to persistent vibration.

In a specific sense, the invention shown in a particular embodiment in the drawing, comprises a pair of split rings or bands 1 and 2, of resilient material, the inner face of the upper band or ring 1 being roughened or knurled for the purpose of obtaining a firm and rigid grip upon the drill rod or pipe 3, when tightened thereupon by the means presently described, and the inner face of the lower ring or band 2 being smooth and arranged to encircle the drill rod or pipe so that it may move relatively thereto. By means of a locking device on the ring or band 1, the band 1 is arranged to be tightened upon the drill rod or pipe 3 in such rigid manner that it will rotate with the drill rod and by means of a similar locking device on the band or ring 2, the ends of the band 2 are arranged to be drawn toward each other in such manner that the band 2 will loosely encircle the drill rod. A form of fastening means for this purpose is illustrated in detail in Fig. 4, and comprises a lever 4 pivotally secured in a lug 5 on one end of each of the bands or rings 1 and 2. To the lever 4 is pivotally attached a loop or link 6 which is arranged for engagement with a lug 7, provided on the other end of each of said rings or bands 1 and 2. By the operation of said lever 4, the relative movement of the ends of the band is accomplished for the purposes stated. The respective rings or bands 1 and 2 are held relatively spaced by spring units 8, the ends of which are provided or formed with loops or eyes 9 through which are arranged to extend pins or bolts 10 supported between pairs of equally spaced lugs 1' and 2' provided on and projecting from said rings or bands 1 and 2 respectively. The spring units 8 are outwardly bowed and are provided intermediate the ends thereof with enlarged portions 11, in which are formed depressions or countersinks 12, for anti-friction means, such as balls 13, which are arranged to be held within the depressions or countersinks by retainers 14, secured to said enlarged portions 11 of the spring units 8. The depressions or countersinks 12 are provided with openings 12' through which detrital or other accumulations may pass, should they collect in the depressions 12 during the operation or rotation of the balls 13 against the wall of an open hole. The outer edges of the enlarged portions 11 of the spring units are inwardly bent or curved, as at 15, for the purpose of enabling the spring units 8 to pass smoothly and freely over the wall of an open hole, should the anti-friction balls 13 be projected into the formation sufficiently for to cause the enlarged portions thereof to contact with the well wall. This is of considerable importance when drilling a well without the use of casing, because without this curviform provision, the engagement of the edges of the spring units with the formation, during the drilling operation would tend to break them and thus throw the drill rod or pipe from a central line.

In practice, the device is slipped over the drill rod or pipe, and only the upper ring or band 1 is securely fastened thereon, the band 2 surrounding the rod or drill pipe with sufficient looseness to enable it to play relatively to said rod or pipe and to the band 1 as the spring units 8 are flexed or accommodate themselves to surface variations. Normally the radii of the anti-friction balls 13 are greater than the diameter of the well hole or the casing, so that upon introduction of the drill rod with the protector, into the hole or casing, the spring units 8 are compressed, and remain under tension during drilling operations.

What I claim, is:

1. A device for attachment to a rotary drill rod to center same in a well and prevent vibration, comprising a split ring arranged to encircle a drill rod and provided with means for locking said ring thereon against longitudinal and relatively rotary movement, a second split ring loosely encircling said drill rod and provided with means for holding the ends thereof together, each of said rings provided with a series of spaced lugs, a plurality of outwardly bowed spring members the ends of which extend between said spaced lugs, means carried by said lugs to connect said spring members removably therewith and hold said rings spaced, the central portions of said spring members having depressions, balls carried in said depressions and means to retain said balls in position.

2. A device for attachment to a rotary drill rod comprising a pair of spaced split rings adapted to encircle said drill rod, means carried by one of said rings to lock same on said drill rod to cause same to rotate therewith, means carried by the other of said rings to conjoin the ends thereof, said other ring loosely encircling the drill rod, both said rings having a series of outwardly directly spaced lugs, a series of outwardly bowed spring members, their respective ends extending between said lugs, means carried by said lugs to connect the ends of said springs removably therewith, said spring members having depressions, balls revolubly seated in said depressions, and means to hold said balls in said depressions.

3. A device of the character disclosed comprising a pair of rings arranged to encircle a drill rod, one of said rings provided with means for locking same on a drill rod to rotate therewith and the other ring loosely encircling said rod for longitudinal movement relatively thereto, a series of outwardly bowed spring members detachably connected with and spacing said rings, said spring members provided intermediate the ends thereof with enlarged portions having inwardly curving edges and with perforated depressions, balls seated in said depressions and means to retain said balls in said depressions.

In testimony whereof I have set my hand.

JOHN H. CUSHING.